April 16, 1935.   E. R. ROSS   1,998,172

POWER TRANSMISSION DEVICE

Filed Dec. 20, 1932   5 Sheets-Sheet 1

INVENTOR
ELMER R. ROSS

BY HIS ATTORNEYS

April 16, 1935.  E. R. ROSS  1,998,172

POWER TRANSMISSION DEVICE

Filed Dec. 20, 1932  5 Sheets-Sheet 3

INVENTOR
ELMER R. ROSS
BY HIS ATTORNEYS

April 16, 1935.   E. R. ROSS   1,998,172
POWER TRANSMISSION DEVICE
Filed Dec. 20, 1932   5 Sheets-Sheet 4

Fig. 6.

INVENTOR
ELMER R. ROSS
BY HIS ATTORNEYS

April 16, 1935.  E. R. ROSS  1,998,172
POWER TRANSMISSION DEVICE
Filed Dec. 20, 1932  5 Sheets-Sheet 5

INVENTOR
ELMER R. ROSS
BY HIS ATTORNEYS

Patented Apr. 16, 1935

1,998,172

UNITED STATES PATENT OFFICE 1,998,172

POWER TRANSMISSION DEVICE

Elmer R. Ross, Bridgeport, Conn., assignor to Raybestos-Manhattan, Inc., Bridgeport, Conn., a corporation of New Jersey Application December 20, 1932, Serial No. 648,064

12 Claims. (Cl. 192—103)

This invention relates to an engagement and/or release device for power transmission, including both driving, or positive power, and braking, or negative power. More particularly, the invention relates to a device in which inertial forces are utilized and applied to the operation of an engagement and/or release device.

The present invention is one which finds application in numerous fields, and may be applied wherever power is to be transmitted at some times and the driving and driven parts are at other times to be disconnected so as to permit operation at different speeds, or entire cessation of operation of one part while the operation of the other part is continued. In one aspect, the invention contemplates a device which may be used in place of known types of over-running clutch. In another aspect, the invention may replace various types of centrifugal clutches which have been used and/or proposed, e. g., as starting clutches. In other aspects, the invention may serve as a speed control device, and it may serve to make automatic various types of clutches in applications which, in the past, have required manual operation. Numerous other applications of my invention will be apparent to those skilled in the art after a study of the following description and the accompanying drawings.

My invention contemplates the use of inertial forces other than mere centrifugal forces for the purpose of controlling the operation of a clutch or other engaging means, and in the following specification and claims, I shall use the word "inertial" in a narrow sense, as distinguished from centrifugal. It is to be understood, however, that my invention also contemplates the use of centrifugal force, either in addition to or apart from the use of inertial force. According to my invention, the centrifugal force is developed in a way which is particularly adapted for application in conjunction with use of inertial forces, although the novel method and means of application are possessed of advantages not dependent upon the concurrent use of inertial force.

There are numerous conditions in the transmission of power under which an automatic engagement and/or release of the connection between the driving and driven elements is desirable. One application which has recently come into great prominence, because of its recent adoption by the automotive industry, is the over-running clutch, or so-called free wheeling. Another application is the starting clutch, in which it is required to bring a motor or other element up to a predetermined speed before engagement is effected. Another application is in starting motors for internal combustion engines, where automatic disengagement must be effected as soon as the engine begins to run on its own power.

These applications, although only a few of the possible applications of my invention, are of great importance at the present time, and are therefore chosen for the purpose of illustrating the construction principle and operation of the invention.

In the accompanying drawings.

Figures 1, 2:
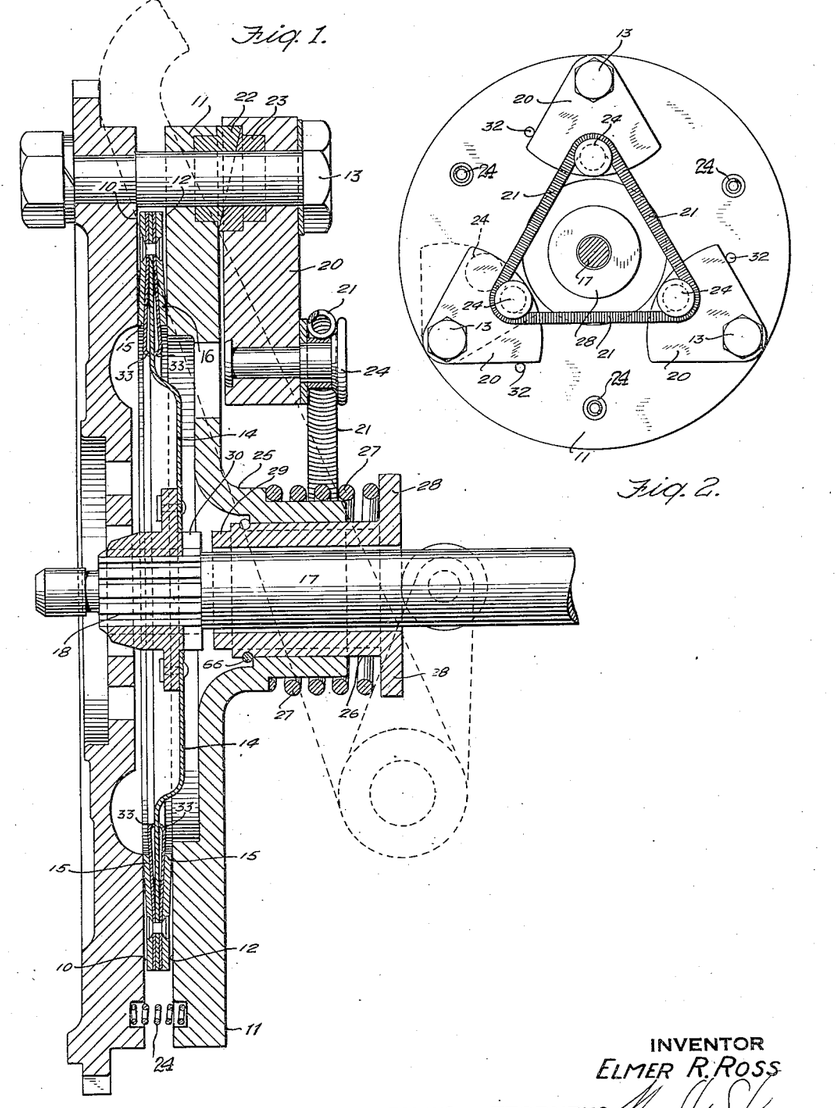
Fig. 1 shows in vertical section a device adapted for use in "free wheeling" and "automatic clutching" in automobiles.
Fig. 2 is an elevation of the clutch operating device shown in Fig. 1.

Referring first to Figs. 1 and 2, I have shown a clutch plate having a face 10 which may be integral with the usual fly wheel, or may be connected thereto. A clamping plate 11 having a cooperating clutch face 12 is slidably mounted on the bolts 13. Between the faces 10 and 12 is positioned the outer portion of a clutch plate 14 having friction faces 15 and 16 secured thereon. This latter clutch plate is slidably mounted on the driven shaft 17, to which it is keyed by means of the fluting 18 at the end of the shaft.

On the outer end of the bolts 13 are mounted the swinging weights 20, and as shown more clearly in Fig. 2, these weights are held toward a released position by means of a spring which may advantageously be a garter spring, as shown at 21. Near the bolts 13, the weights 20 and the clamping ring 11 are formed with complementary cam faces 22 and 23, such that rotation of the weight 20 about the bolt 13 will result in a movement of the clamping ring 11 toward the clutch face 10, and a consequent engagement of the faces 10 and 12 with the friction facings 15 and 16. The clamping ring 11 is normally urged away from the clutch face 10 by spring means 24, so that when the weights 20 are in released position, the clamping ring 11 will normally be separated from the face 10 sufficiently to avoid frictional connection with the driven plate 14.

Ordinarily it is preferable to provide some means for locking out the automatic operating device so as to provide for positive engagement under manual control. For this purpose, the ring 11, in the present instance, is formed with a central hub 25 which is slidably mounted upon and keyed to a hub 26. A spring 27 between the hub 25 and a collar 28 on the hub 26 urges the hub 25 forward on the hub 26 toward the fly wheel, i. e., toward engagement of the clutch. The hub 26 is rotatably mounted on the shaft 17, and is provided at one end with dogs 29 adapted to engage complementary dogs 30 in the hub of the clutch plate 14. Movement of the hub 28 may be effected by the usual clutch pedal or any other convenient pedal or handle, e. g., through the roller arm 31 which is adapted to be pressed against the collar 28.

A stop 66 on the hub 26 limits the movement of the hub 25 thereon, and thereby prevents the spring 27 from causing engagement of the clutch except when the hub 26 is moved.

A stop 32 may be used, as shown in Fig. 2, for the purpose of limiting the movement of the weights 20 toward the release position. The annular spring plates 33, which are shown in Fig. 1 beneath the friction facings 15 and 16, are desirable with but not essential to the present invention. These, moreover, are representative of numerous and various types of means for effecting a smooth and gradual engagement known to the art which may be used with the present invention.

In the operation of the device just described, any acceleration of the driving member causes a swinging of the weights 20 about their pivot 13 in a direction opposite to the direction in which the driving member is moved. The result will be a cam action at the surfaces 22—23, which will force the clamping ring 11 toward the clutch face 10, and will thereby effect engagement of the faces 10 and 12 with the friction facings 15 and 16 of the plate 14. Consequently, the driven element will be engaged with the driving element, and power will be transmitted thereto. "Grabbing" of the clutch will, however, necessarily be avoided, since any tendency to grab will result in an immediate deceleration of the motor, which will result in an opposite inertial force, and will release the clutch to a greater or less extent, depending upon the degree of the deceleration.

As the load is brought up to its normal operating speed, the weights 20 will be acted upon by centrifugal force, so that upon the continued operation after acceleration has ceased, the clutch will be held engaged by centrifugal force. Upon throttling or shutting off the motor, an immediate drag will be produced, with consequent declaration, and an inertial force will be produced upon the weights 20 which will move them back toward the release position. This movement will be assisted by the action of the spring 21, and so long as the deceleration continues, the clutch will remain disengaged. If the deceleration continues so far that the speed of the driving member is reduced below that at which the centrifugal force will overcome the force of the spring 21, the clutch will thereafter remain disengaged until the driving member is again accelerated. If, however, the driving member is slowed only a little, to a speed at which the centrifugal effect is sufficient to overcome the tension of the spring 21, the clutch will then reengage after the deceleration has ceased.

As applied to the specific problem of free wheeling in automobiles, the device as just described is possessed of numerous important advantages. It will have been already appreciated from what has been said above that when used in an automobile, the clutch will engage automatically whenever the motor is accelerated, and will be disengaged whenever the motor is throttled. Thus the coasting which is the purpose of free wheeling is automatically attained without the introduction of any new driving elements, but merely by modification of a standard clutch such as has been necessarily used heretofore.

With the clutch of my invention, there is no need for additional clutching by means of a pedal at any time. When the motor is started, the gear-shift will be positioned in neutral. To engage low speed or reverse after the motor is started, it is only necessary to throttle the motor down to a speed at which the garter spring 21 overcomes the centrifugal effect on the weights 20 sufficiently to disengage the clutch. The gears are then shifted into low speed or reverse, and thereafter at each shifting operation, the accelerator is released sufficiently to produce a deceleration which will release the clutch. When driving at high speed, the clutch is automatically engaged whenever power is being applied by the motor, and it is automatically disengaged whenever the motor is throttled, e. g., by releasing the accelerator. Furthermore, the clutch is automatically released by any sudden application of the brakes, which is a feature not attainable with any free wheeling device known prior to my invention. The same is true in the case of a sudden impact, as would be encountered in a collision, or if the car should mount a curb, or leave the road. In all of these cases, a sudden deceleration would occur which would cause immediate release of the clutch. This release would, if the accelerator were not promptly released, result in the speeding up of the motor because of its being free from its load, and a consequent reengagement by acceleration. However, in case of a collision or accident, the operator would, of course, promptly release the accelerator, and the instant gained by the automatic release of the clutch would add a small factor of safety which might, in many cases, lessen the damage resulting from an accident, or even avoid an accident which otherwise might have proved serious.

A further advantage of this type of clutch as applied to automobiles is that it protects the motor against overloading and stalling. For example, in pulling the car up a hill or through sand or other heavy going, if the motor is slowed down below a predetermined speed, for example, 400 to 700 R. P. M., depending upon the rapidity of deceleration, the clutch would be automatically released. Although the motor will continue to pull the car, it would do so with slippage in the clutch which will prevent the stalling. This constitutes an important safety feature, and at the same time protects the motor against abuse by warning the driver when the motor is overloaded.

A further advantage which is possessed by this type of clutch over the free wheeling as commonly used in the transmission gearset is the elimination of lubricating problems. The overrunning clutches which have commonly been relied upon for free wheeling are peculiarly subject to changes in the viscosity of the transmission lubricant, and may be rendered inoperative in cold weather. No such difficulty could be encountered with the device of my invention, and, on the contrary, the lubrication is no more difficult than in any similar pedal-operated clutch.

Although it is one purpose of the present invention to provide for coasting down hill or in coming to a stop, nevertheless it is frequently desirable to have the motor engaged during the coasting, so that the motor may act as a brake. In the free wheeling devices heretofore used, the means for locking out the free wheeling device and effecting positive engagement between the motor and the wheels are difficult to operate, and necessitate diverting attention from the road to find the particular lever or button on the dash or transmission for operating the locking out device. With the clutch of my invention, since pedal operation to disengage the clutch is never required, the ordinary clutch pedal may be utilized for effecting positive engagement. This positive engagement is, in the embodiment shown in the drawings, readily effected, since the operation of the lockout pedal or handle moves the ring 11 first into position for frictional engagement, whereby the speeds of driving and driven element are synchronized, and then, upon further movement, engages the dogs 29 and 30. Thus a positive engagement may be effected at any speed without difficulty from clashing. This feature is of great importance, particularly in driving on mountainous roads, where the curves and increasing grades may necessitate the use of the motor for braking purposes after one has started down hill, and where a moment's inattention to the road may result in an accident. Under such conditions, the engagement of the usual free wheeling devices may be particularly difficult, due to clashing of the engaging means because of difference in speed between the driving and driven parts, and it is ordinarily necessary to bring the motor up to speed while engaging the locking out device.

Furthermore, under ordinary conditions, and except for the possibility of slipping in the clutch, it is never necessary to use the positive lockout. Assuming, for example, that one has started down a hill with the clutch disengaged, and finds the grade so steep that he prefers to engage the motor, it is only necessary to depress the accelerator slightly, and to speed the motor up just above the idling speed. Acceleration of the motor will cause engagement and as soon as the motor has attained such a speed and has ceased to accelerate, the centrifugal force will hold the engagement of the clutch. Moreover, immediately upon engagement, the motor will be accelerated by the driving action of the wheels, and accordingly the inertial force will be added to the centrifugal force. The accelerator may, therefore, be released again as soon as the clutch is engaged, and thereafter the clutch will remain engaged so long as the accelerator is left undisturbed. Thus it is not necessary to speed up the motor enough to cause engagement by centrifugal effect and braking by the motor comes into play at once. Should it be desired again to release the clutch, it is only necessary to depress the accelerator for an instant and again to release it. Similarly, if the driver comes to the top of a hill which he believes to be too steep for free wheel coasting, he may keep his clutch engaged by merely releasing his accelerator gradually, in which case the deceleration will not be sufficient to overcome the centrifugal force, and the clutch will remain engaged. Thus under all normal conditions it is possible to drive without ever using the clutch pedal for any purpose whatsoever. This leaves the left foot free for application of the brake, if desired, and accordingly one may drive with one foot ready to apply the brake and the other to operate the accelerator at all times.

It is to be understood, of course, that my invention may be embodied in numerous other ways; for example, the particular type of clutch adopted is not essential to my invention. Other types of engagement devices could be used. The inertial force may be applied to the operation of the clutch or other engaging means in numerous other ways which will occur to those skilled in the art. For example, a part of the clutch assembly other than the centrifugal weights may be made to constitute an inertial member, so that upon acceleration the clutch plates will be driven one against the other, and upon deceleration will be separated therefrom; e. g. a balanced inertial ring, upon the periphery of one or both of the clutch plates could be used as the inertial member. This is shown in Figure 3.

Figure 3:
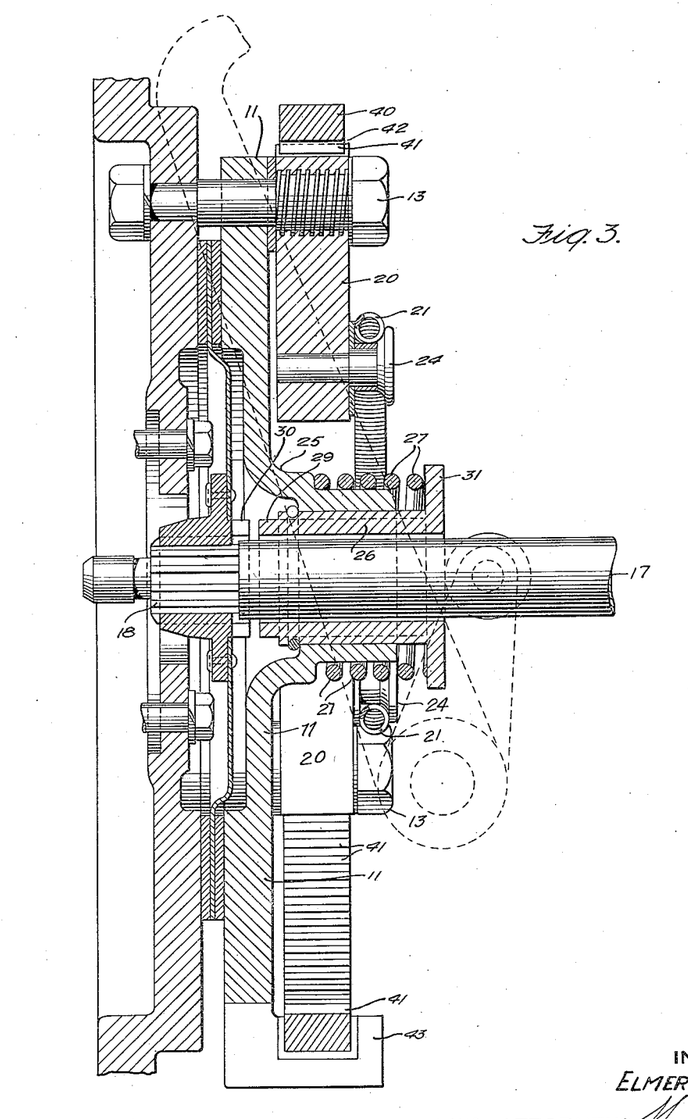
Fig. 3 is a view similar to Fig. 1, showing a modified embodiment of the invention.

In Fig. 3, I have shown an embodiment of the invention illustrating this latter type of inertial member, in this case combined with the pivoted weights, as shown in Figs. 1 and 2. In this case, also, a screw thread on the pivot bolt 13 and in the pivoted weights 20 replaces the cam faces 22—23, as shown in Fig. 1.

With the embodiment shown in Fig. 1, the proper balance between inertial and centrifugal forces may be attained by adjusting the tension of the spring 21 and the position of the center of gravity of the weights with respect to their pivots when in the released and in the engaged positions. For example, if the center of gravity operates within an arc close to the tangent through the pivot 13, the moment of the inertial force upon the weights will be slight as compared with the moment of centrifugal force. On the other hand, if the center of gravity lies close to the radius of the orbit of the pivot 13, the effect of centrifugal force will be minimized, while the effect of the inertial force will be near a maximum. Again, if the cam 22—23, or screw thread in Fig. 3 is steep, so that the operating arc of each weight 20 is small and the studs 24 are, in their normal released position, close to the center as shown in Fig. 2, the spring will have a small mechanical advantage, whereas if the stop 32 is positioned so that the studs 24 are swung well out, even in their released position, the mechanical advantage of the spring may be increased.

Thus it is possible, by adjusting the position of the weights 20 and particularly of the studs 24 and of the center of gravity of the weights with respect to the pivots 13, and by adjusting the mass of the weights 20 and the tension of the spring 21, to secure the desired balance. That this balance is of importance is illustrated, for example, in the case where the clutch is used for free wheeling. In this case, the clutch is to be engaged by centrifugal force over a wide range of speeds. Unless the inertial force is given a substantial advantage in such case, the centrifugal force may, at high speeds, be so great as to resist effectively the inertial force, and therefore the free wheeling would then become inoperative at such high speeds.

In Fig. 3 I have illustrated another way of altering the balance between the inertial and centrifugal effects. In this case, a supplemental inertial member 40 is provided. This supplemental member is, in the present instance, in the form of a balanced ring having internal gear teeth 41 which engage with gear teeth 42 on the weights 20. This ring is held in bearings in the brackets 43 on the clamping ring 11, and since the ring floats in the brackets 43, it is free to rotate under the influence of inertia, and thereby to apply an inertial force upon the pivoted members 20. Obviously, by adjusting the relative weights of the pivoted members 20 and the floating ring 40, any desired balance may be secured between centrifugal and inertial effects, and, if desired, the centrifugal effect may be entirely eliminated, and balanced pinions substituted for the weights 20, or the centrifugal and inertial means may be entirely divorced, the centrifugal means being radially movable so that inertial forces will not affect them.

In any case it is desirable, and particularly where a device is to be rotated at high speeds, that the entire device should be in dynamic balance. Thus, with the device as shown in Figs. 1 to 3, the weights, regardless of their position, will balance one another.

From the above, it will be understood that inertial and centrifugal means may be embodied in one or in separate elements. It is also to be understood that although ordinarily the centrifugal and inertial means will be connected to the driving member, in some cases and for some purposes, one or both may be connected to the driven member.

Figures 4, 5:
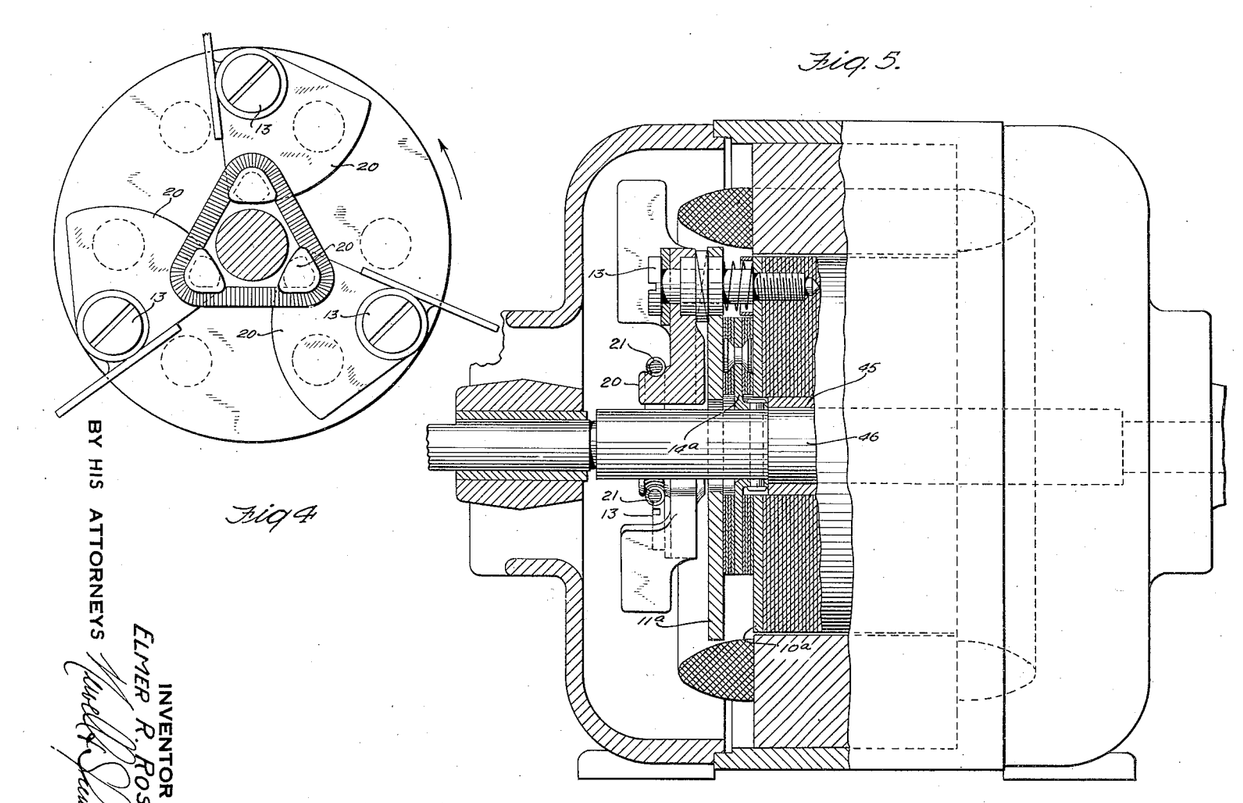
Fig. 4 is a view in elevation, similar to Fig. 2, showing a clutch operating mechanism particularly adapted for use as a starting clutch, e. g., for permitting the starting of electric motors before imposing the load thereon.
Fig. 5 is a section taken on line 5—5 of Fig. 4.

In Figs. 4 and 5, I have illustrated another application of my invention. In the use of electric motors, and particularly of fractional horsepower electric motors, it is frequently essential to reduce the starting current to a value which does not greatly exceed the normal operating current. For this purpose, prior to my invention, various centrifugal clutches have been suggested and tried. I have found that the novel type of clutch made according to my present invention is particularly adapted for this purpose.

In this application the centrifugal effect should outweigh the inertial effect, and I have accordingly shown the pivoted weights 20 positioned so that their centers of gravity are near the orbit of the pivots 13. The clutch as shown in Figs. 4 and 5 may be operated in either direction, according to the effect desired. If operated in the direction indicated by the arrow, the inertial effect due to acceleration will tend to engage the clutch. Since, however, the effect of inertia is slight as compared with the effect of centrifugal force, the clutch will not be engaged until the speed of the motor approaches its normal running speed. It will, however, be engaged substantially below its normal running speed because of the added effect of inertia. Immediately upon becoming engaged, the motor will be slowed by imposition of the load, and this slowing will, in turn, create a counter inertial effect and a decrease in the centrifugal force. Consequently, the clutch will be promptly disengaged, with only a slight decrease in speed, but after having yielded a substantial part of its kinetic energy to the driven element. When the clutch is thus released, the motor will again run free, and consequently will immediately pick up speed, and will be re-engaged. This cycle will be repeated over and over until the load is brought up to the speed of the motor, after which the drive will continue without slippage and the clutch will be held engaged by the effect of centrifugal force. Due to the repeated impact of the motor upon the load, the starting torque may, by the use of such clutch, be increased as much as seven, or even ten times the full load torque which could be delivered on a direct drive.

With the clutch operating in the direction just described, the effect is a smooth starting without shock, since the clutch will never grab, or, if it has any tendency to grab, will be immediately thrown out by the inertial effect of the resulting deceleration. If a still greater starting torque is desired, this can be obtained, at the expense of some smoothness, by operating the clutch in the reverse direction from that just described. In this case, the centrifugal effect will operate as already described, but instead of the inertial effect of the acceleration supporting the centrifugal effect, it is opposed thereto. Consequently the motor will attain a speed equal to, or greater than its normal running speed before the clutch becomes engaged. Immediately upon the clutch engaging, the inertial effect of the deceleration will be added to the centrifugal effect, and as a consequence the clutch will grab and the effect upon the load will be that of a hammer blow, i. e., the throwing of the full kinetic energy of the motor almost instantaneously against the load. As the speed of the motor is rapidly cut down, however, the inertial effect of the deceleration will be overbalanced by decrease in centrifugal effect, and the spring 21 will pull back the weights 20 and release the clutch, giving the motor an opportunity again to pick up speed. This cycle will be repeated as before until the motor has come up to speed, after which the drive will be direct and smooth.

Although I have shown in the embodiment illustrated in Figs. 4 and 5 the weights 20 with their centers of gravity near the path of the pivots 13, it will be understood that the desired balance between centrifugal and inertial effects may be obtained in other ways, e. g., as described above in connection with Figs. 1 to 3, and it will be understood, of course, that the particular balance between centrifugal and inertial effects may be varied to suit the particular condition of each application.

When a clutch such as that shown in Figs. 4 and 5 is to be included within the motor housing, the armature of the motor may, as shown in Fig. 5, advantageously be mounted upon a sleeve 45, which runs freely upon a motor shaft 46. The shaft 46 is connected to the clutch plate 14a, while the armature and its sleeve 45 are connected to the plates 10a and 11a. Thus the motor shaft 46 is driven by the armature through the clutch.

Obviously, instead of applying the clutch within the motor housing, a standard motor could be used and the clutch could be positioned at any point in the drive connections between the motor and its load. For example, the clutch may advantageously be built into a pulley which is secured to the shaft of a standard motor. Obviously, also, this type of clutch may be applied in any drive, regardless of whether an electric motor is used, or not. For example, one application of this type of clutch is in connection with small internal combustion engines in outboard marine motors. The use of this clutch enables the operator to start the motor without turning the propeller and the gearing connected thereto, and further permits of idling the motor without moving the boat.

Figure 6:
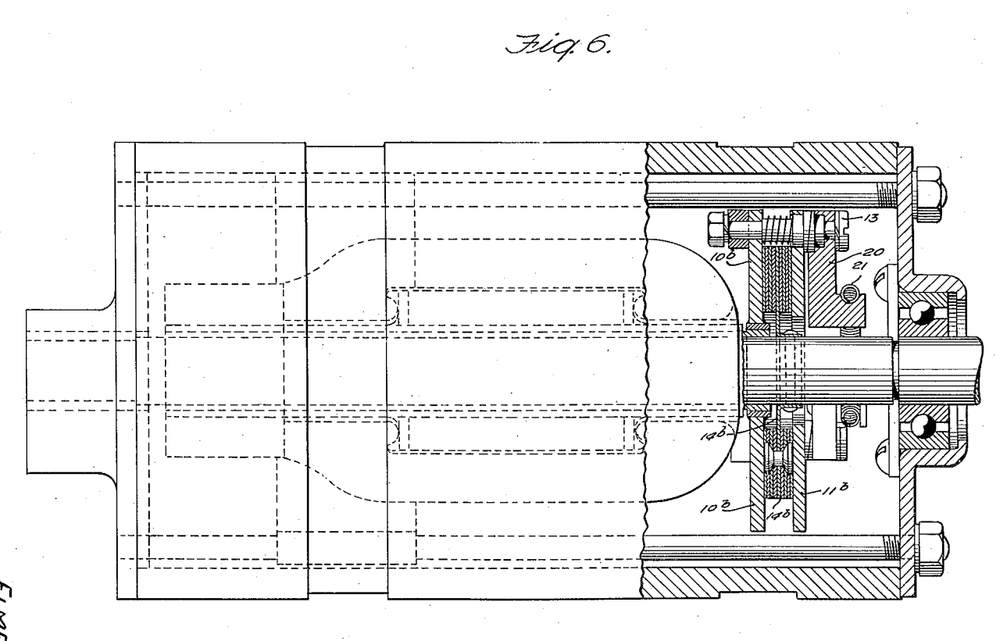
Fig. 6 is a longitudinal section showing an application of a device of my invention as a speed regulator on a generator, e. g., as applied to an internal combustion motor.

In Fig. 6 I have shown another application of my novel clutch for the purpose of maintaining a constant speed upon a driven member, regardless of the speed of a variable power source. The particular application as illustrated is a generator for use on an automobile engine. Considerable difficulty has been experienced in designing generators to maintain a proper charge in the battery, because of the fact that the charging rate reaches a maximum at some predetermined speed and drops off above. Therefore, cars which are used constantly for high speed driving cannot maintain a satisfactory charge in the battery unless an oversized generator is provided.

By the use of the clutch as illustrated in Fig. 6, the generator may be operated at its optimum charging speed, regardless of any increase in speed of the automobile engine. In this case, pivoted members are connected to the driven instead of to the driving member, and the clutch in its condition at rest is engaged instead of disengaged. In this case also, the clutch is preferably operated in a direction such that the inertial effect of acceleration is to increase the engaging pressure on the clutch and the effect of deceleration to release the clutch. The effect of centrifugal action must, of course, in this case be to release the clutch. The slope on the cams 22—23 and the strength of the spring 21, and the mass and position of the weights 20 are so chosen and designed that at the optimum generator speed, the clutch will be released to permit slipping, but below that speed the clutch will be engaged. Thus the optimum generator speed may be constantly maintained so long as the automobile engine is operating at a corresponding speed, or above. The clutch may also be designed so that when the automobile engine is throttled, the deceleration will result in releasing the generator clutch, and the generator may, therefore, continue to rotate at a higher speed than that of its driving connection with the automobile engine.

Referring to the particular construction shown in Fig. 6, the armature in this case, as in Figs. 4 and 5, is mounted upon a sleeve journaled over the shaft. The shaft in this case is connected to the clutch disc 14b, whereas the armature sleeve is connected to the clutch plate 10b. Thus the armature may rotate at a speed different from that of the shaft upon which it is mounted.

The clutch of my invention, for example one constructed as shown in Fig. 6, may be utilized also for the starting of other motors, e. g., for the cranking of internal combustion engines. In this case the starting motor shaft is connected to the disc 14b and the plates 10b and 11b are connected to the drive by which the engine is to be turned during the cranking. In this case, as in the case illustrated in Fig. 6, the clutch is engaged when at rest, that is to say, when the weights are drawn toward the center, and is released when the weights are thrown out from the center. The spring 21 is of sufficient strength to hold the clutch engaged against centrifugal force at the full cranking speed, but is designed to be overcome by centrifugal force at any substantially higher speed. In the released position, the centers of gravity of the weights 20 are preferably close to the center and are swung away from the center, preferably close to the path of the pivots 13 when the clutch is released.

In the operation of this clutch, the clutch is initially engaged, and therefore the motor is started against its load. The initial starting torque may, however, produce sufficient inertial effect to cause some slipping in the clutch, and thereby to relieve the motor of a part of the starting load. During the cranking operation, the clutch is held engaged by the spring 21, and since the center of gravity of the weights 20 are close to the center, the moment of the centrifugal force will, during this operation, be relatively slight. As soon as the engine begins to run under its own power, however, there will be a sudden acceleration which will cause the weights to swing out in the released position where they will be held by the centrifugal force. So long as the starting connection remains in gear with the engine, and so long as the engine continues to run under its own power, the clutch will be held released by centrifugal force, and since in the released position the moment of the centrifugal force greatly exceeds the moment of inertial force, the effect of acceleration and deceleration of the motor will be minimized. In the meantime, the starting motor may be cut off, and will then return to rest, since the plate 14b will then be free from plates 10b and 11b.

In addition to the numerous applications of the clutch of my invention for positive drive connections, my invention may also be utilized as a braking device, i. e., negative power connection. Thus, in Figs. 7 and 8 I have illustrated one way in which my invention may be applied for braking. In this case, the weights 20c are normally held in the released position by means of the cone 50. The clutch plate 14c in this case is held rigidly, whereas the plates 10c and 11c are connected to the drive shaft, or axle of the vehicle, or to any other shaft which is to be braked. The weights 20c are in this case preferably positioned so that their centers of gravity are substantially spaced circumferentially from the pivots 13c, so that the effect of centrifugal force tends to hold the brake applied at the high speeds. However, the centrifugal and inertial means should be designed, proportioned and/or positioned so that the inertial effect will overcome the centrifugal effect.

Figure 7:
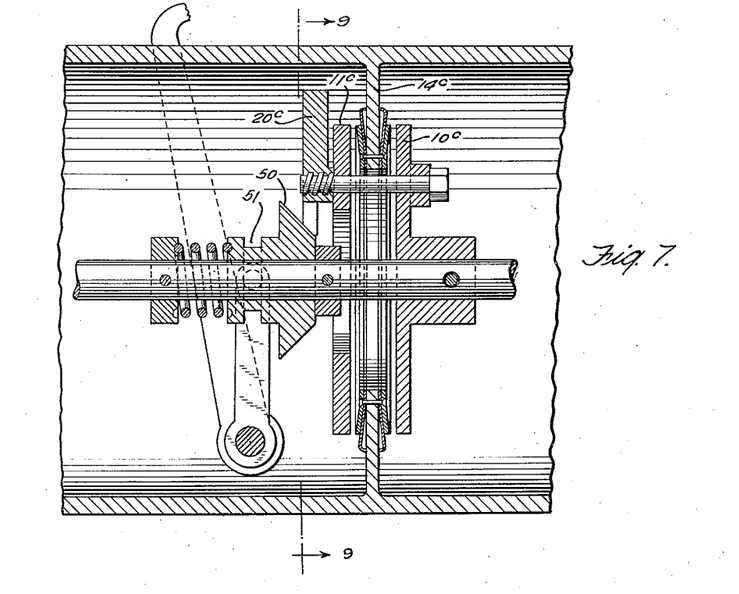
Fig. 7 is a vertical section of an embodiment of the invention which is adapted for use as a brake.
Figure 8:
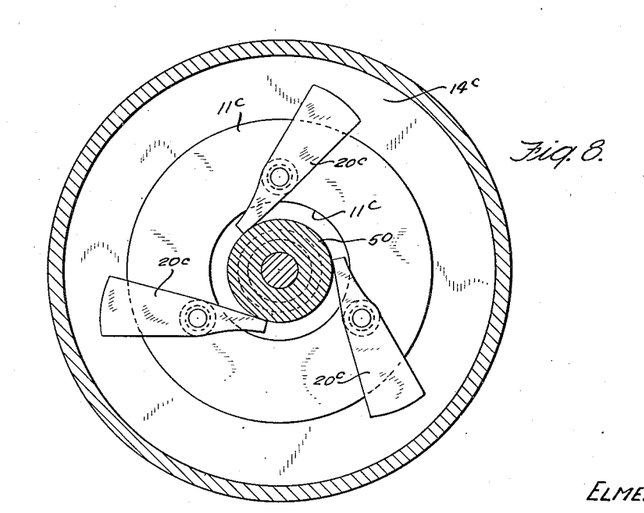
Fig. 8 is a cross section taken on line 9—9 of Fig. 7.

In operation, the weights 20c are normally held in the released position by the cone 50. As the cone is withdrawn, e. g., by a yoke operating in the groove 51, the centrifugal force will move the weights 20c, and thereby move the brake plate 11c so as to clamp upon the fixed plate 14c. If the initial braking effect is sufficient to slide the wheels, the deceleration will be excessive, and the resulting inertial effect will operate to release the brake until the wheels once more take hold upon the road. Thus, skidding, even upon icy pavements, may be substantially avoided. In a preferred form of this brake, the brake is designed to produce a maximum deceleration, and will produce such deceleration without excessive slippage of the wheels. If it is desired to produce a lesser braking effect, this is accomplished by only partially withdrawing the cone 50. In this case, the movement of the weights 20c will be limited, and the braking effect will be correspondingly limited. Nevertheless, the inertial control feature will still be operating, regardless of the degree the cone 50 is withdrawn, and if during such partial braking a slippery place should be encountered in the road, the brake will automatically release to accommodate itself to the road condition.

Although I have described above certain preferred embodiments of my invention, and have suggested numerous applications of my invention, it is to be understood that these are not given as an exhaustive exposition of the possibilities thereof, but are merely illustrative of the numerous applications and the almost limitless possibilities of my invention.

What I claim is:

1. An automatic engagement and release mechanism for power transmission which comprises driving and driven members adapted to be engaged for power transmission and to be separated for independent operation of either, a pivotal weight mounted for planetary revolution with one of said members and for rotation about its own axis in a plane transverse to the axis of said members by centrifugal and inertial forces due to rotation and to angular acceleration and deceleration, respectively, and means associated with said weight and one of said members, to effect engagement and disengagement of said members upon rotation of said weight in one direction by inertial force and in the opposite direction by inertial and centrifugal force.

2. An automatic engagement and release mechanism as defined in claim 1, in which a plurality of the pivoted weights, and more than two, are spaced about the center of rotation of the power transmission member to which they are connected, and each is urged toward a predetermined position by a garter spring connecting them all.

3. An automatic engagement and release mechanism for power transmission which comprises driving and driven elements adapted to be operated to engage for power transmission and to disengage for independent operation of either, centrifugal and inertial means associated with one of said elements adapted to apply centrifugal force for operation of said elements and to apply inertial forces resulting from rotational acceleration and deceleration, of said elements respectively to support and oppose such operation.

4. An automatic engagement and release mechanism as defined in claim 3 in which the driving and driven elements comprise means slidably mounted on one of said elements for movement into and away from frictional engagement with the other, said engagement being maintained substantially entirely by inertial and centrifugal force applied thereto by the inertial means.

5. An automatic engagement and release mechanism for power transmission, which comprises driving and driven members adapted to be engaged for power transmission and to be separated for independent operation of either, a pivotal weight mounted for planetary revolution with one of said members, and for limited rotation about its own axis in a plane transverse to the axis of said members, and within a range in which the center of gravity is at such position in its orbit about the pivot of the weight as to give inertial forces, due to angular acceleration and deceleration, an advantage with respect to centrifugal force due to simple rotation such that available acceleration from a normal minimum speed and deceleration from a normal maximum speed will effect engagement and release regardless of the centrifugal force.

6. An automatic engagement and release mechanism as defined in claim 5, in which there are a plurality of the pivoted weights so mounted as to balance each other during said planetary revolution.

7. A clutch which comprises driving and driven members adapted for operation frictionally to engage one another and to be disengaged from each other, centrifugal and inertial means movably mounted on one of said members so as to be acted upon by centrifugal and inertial forces, adapted to effect operation in one of said ways when moved in one direction and in the other when moved in a reverse direction, and adapted to effect such movement in one direction by centrifugal force due to simple rotation above a predetermined speed, to oppose said operating effect of centrifugal force and tend to effect operation in the other way by inertial force due to angular acceleration when said member is speeded up and to support said operating effect of centrifugal force by inertial force due to angular deceleration when said member is slowing down.

8. A clutch which comprises driving and driven members adapted for operation frictionally to engage one another and to be disengaged from each other, centrifugal and inertial means movably mounted on one of said members so as to be acted upon by centrifugal and inertial forces adapted to effect operation in one of said ways when moved in one direction and in the other when moved in a reverse direction, and adapted to effect such movement in one direction by centrifugal force due to simple rotation above a predetermined speed, to support said operating effect of centrifgal force by inertial force due to angular acceleration when said member is speeded up, and to oppose said operating effect and tend to effect operation in the other way by inertial force due to angular deceleration when said member is slowing down.

9. An automatic engagement and release mechanism for power transmission which comprises driving and driven elements adapted to be operated to engage for power transmission and to disengage for independent operation of either, centrifugal and inertial means associated with one of said elements adapted to apply centrifugal force for operation of said elements and to apply inertial forces resulting from rotational acceleration and deceleration of said elements respectively to support and oppose such operation, the means by which the inertial and centrifugal forces are exerted being so balanced that the inertial force resulting from a predetermined acceleration or deceleration will overcome the centrifugal force at all normal operating speeds.

10. An automatic engagement and release mechanism for power transmission which comprises driving and driven elements adapted to be operated to engage for power transmission and to disengage for independent operation of either, a pivoted weight serving as centrifugal and inertial means associated with one of said elements adapted to apply centrifugal force for operation of said elements and to apply inertial forces resulting from rotational acceleration and deceleration of said elements respectively to support and oppose such operation.

11. An automatic engagement and release mechanism for power transmission which comprises driving and driven elements adapted to be operated to engage for power transmission and to disengage for independent operation of either, centrifugal and inertial means associated with one of said elements adapted to apply centrifugal force for operation of said elements and to apply inertial forces resulting from rotational acceleration and deceleration of said elements respectively to support and oppose such operation, the centrifugal and inertial means being so balanced that the moment of the inertial force acting thereon when the members are normally engaged is insufficient to effect non-slipping engagement except when assisted by the moment of centrifugal force when the member is rotating above a predetermined minimum speed.

12. A clutch which comprises driving and driven members adapted for operation frictionally to engage one another and to be disengaged from each other, a pivoted wight which serves as centrifugal and inertial means movably mounted on one of said members so as to be acted upon by centrifugal and inertial forces, adapted to effect operation in one of said ways when moved in one direction and in the other when moved in a reverse direction, and adapted to effect such movement in one direction by centrifugal force due to simple rotation above a predetermined speed, to oppose said operating effect of centrifugal force and tend to effect operation in the other way by inertial force due to angular acceleration when said member is speeded up and to support said operating effect of centrifugal force by inertial force due to angular deceleration when said member is slowing down.

ELMER R. ROSS.